Patented July 22, 1924.

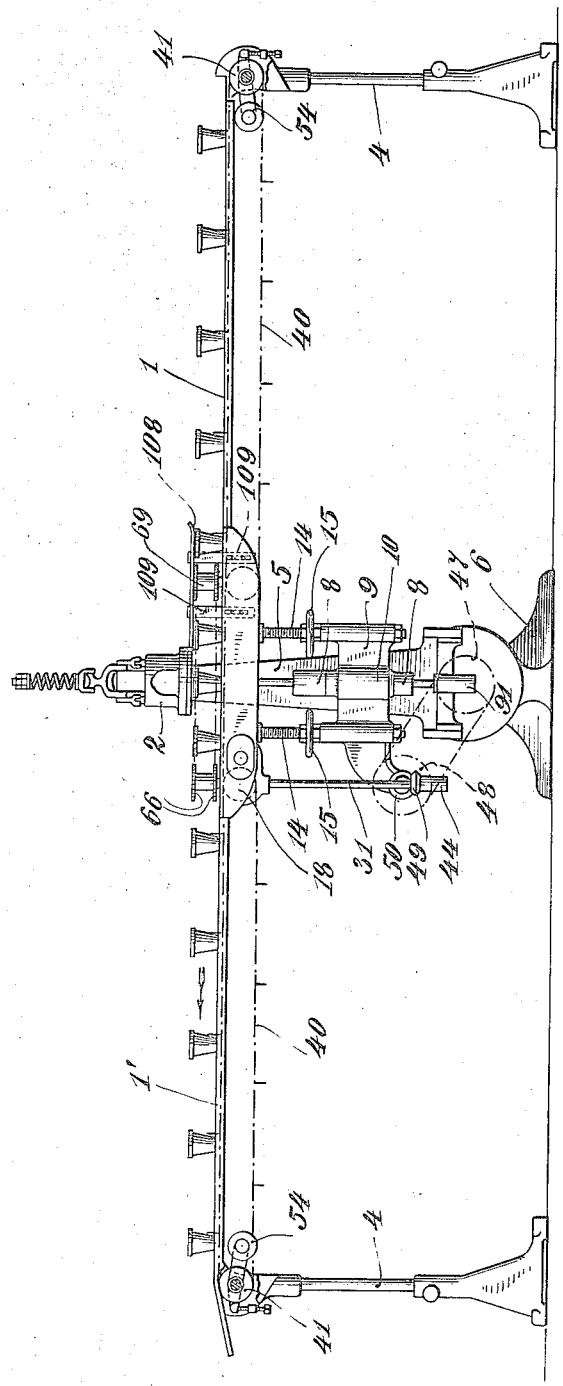

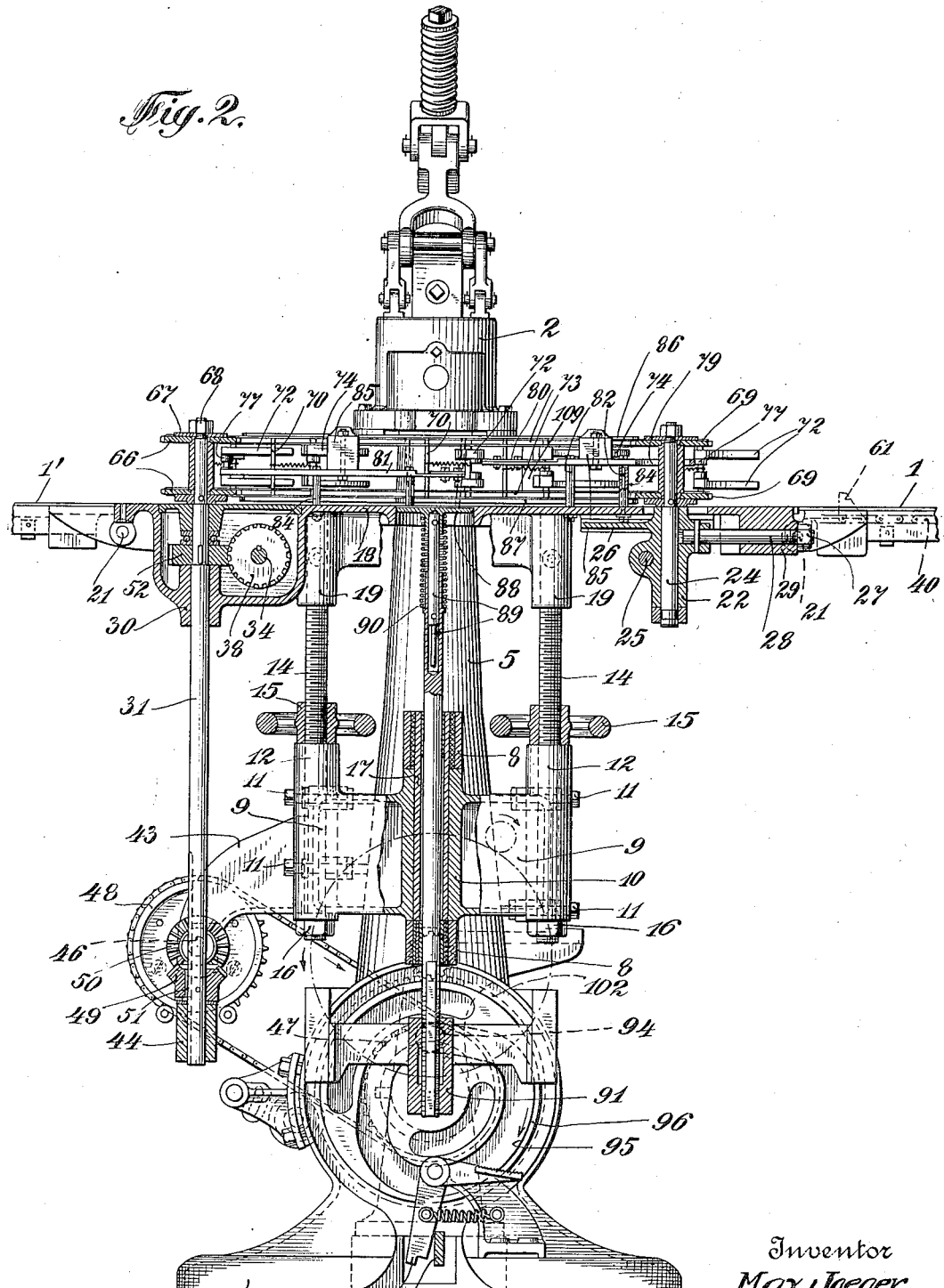

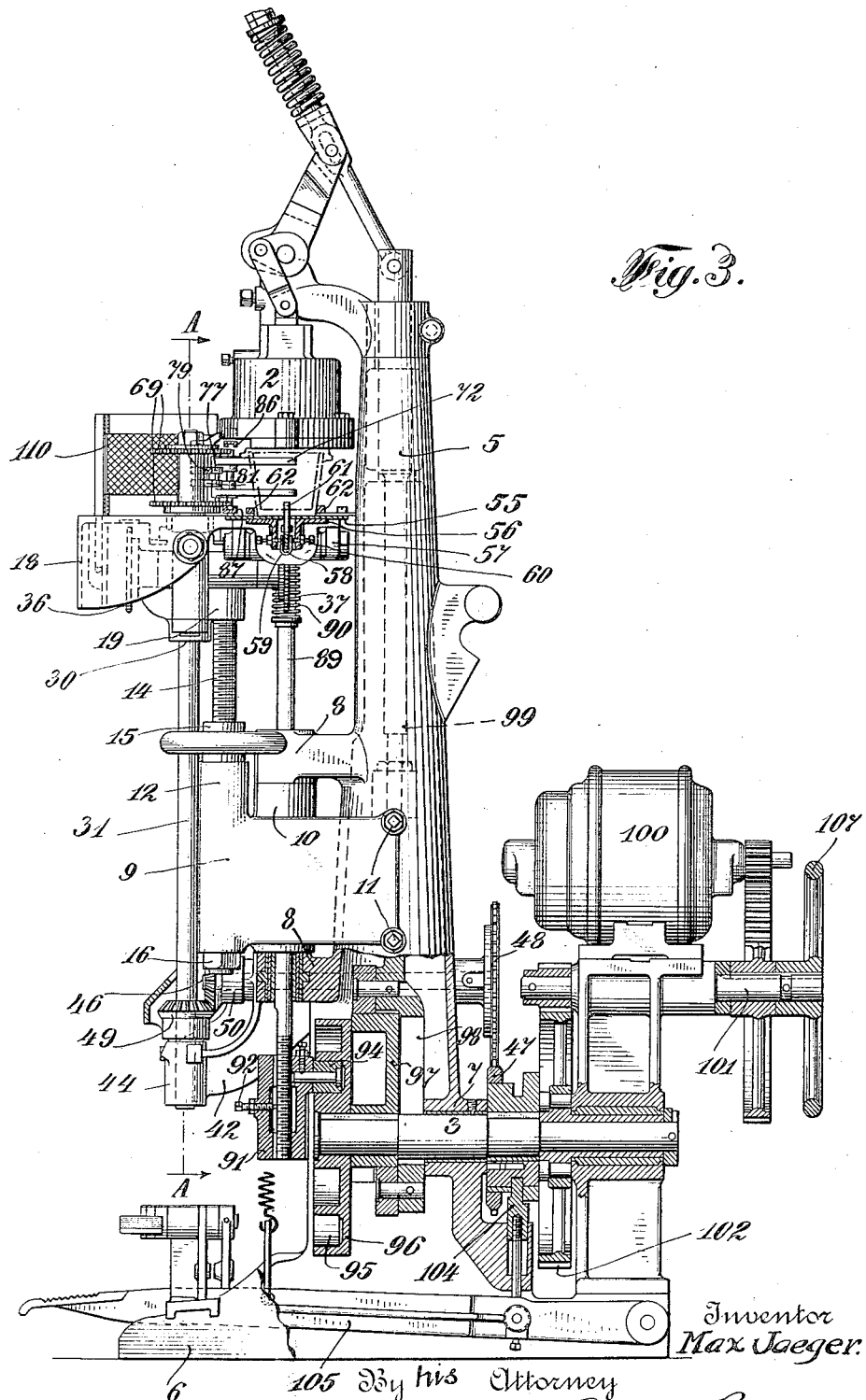

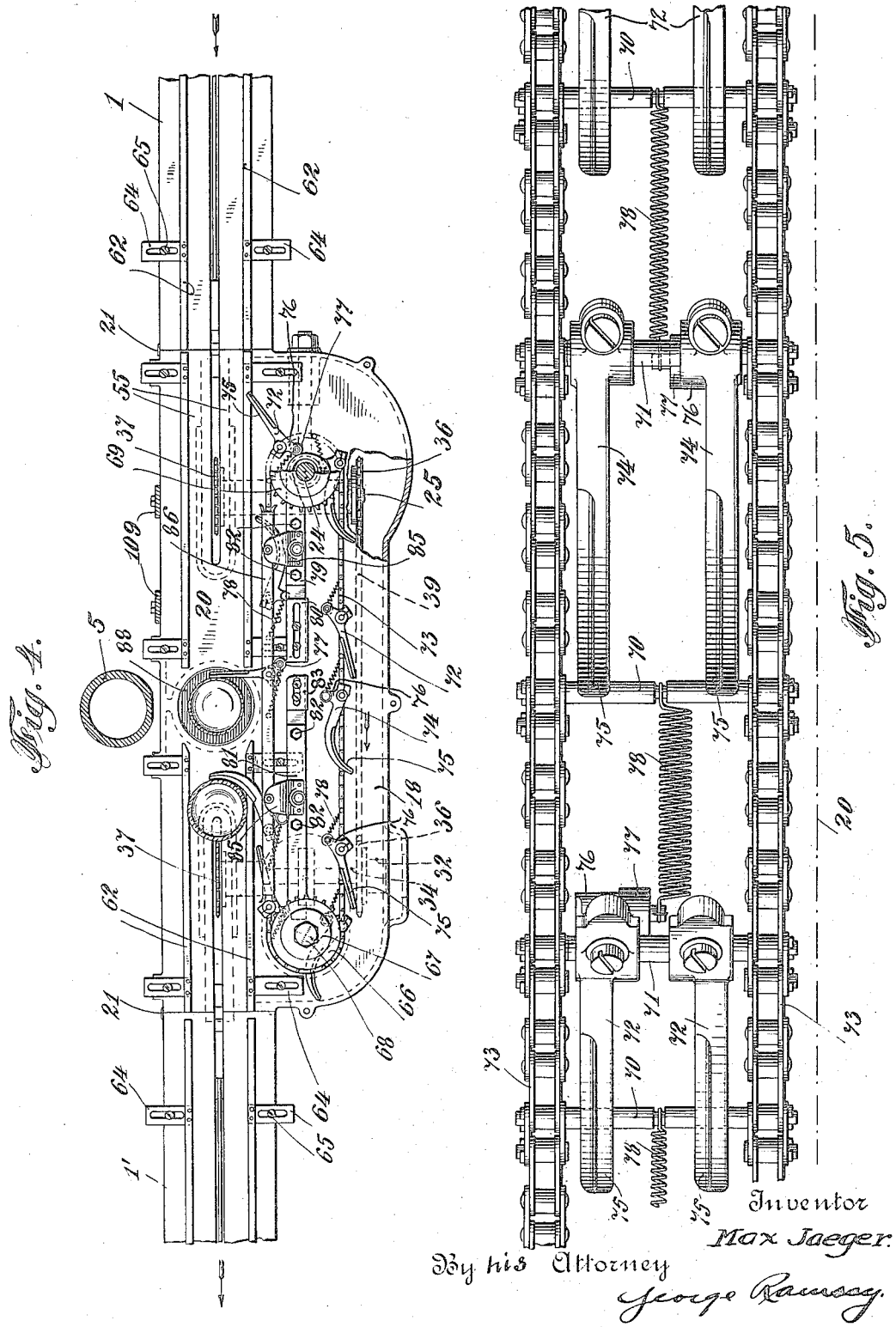

1,502,635

UNITED STATES PATENT OFFICE.

MAX JAEGER, OF BROOKLYN, NEW YORK, ASSIGNOR TO ANCHOR CAP & CLOSURE CORPORATION, OF BROOKLYN, NEW YORK, A CORPORATION OF NEW YORK.

PACKAGE-HANDLING MACHINE.

Application filed January 27, 1920. Serial No. 354,416.

*To all whom it may concern:*

Be it known that I, MAX JAEGER, a citizen of the United States, residing at Brooklyn, in the county of Kings, State of New York, have invented certain new and useful Improvements in Package-Handling Machines, of which the following is a specification.

This invention relates generally to a type of machine for the handling of articles individually and automatically in conjunction with the performance of various operations thereon. While its scope of use and variety of embodiments are quite broad, it is designed particularly for the handling of containers or vessels for the purpose of applying or sealing suitable closures thereon to form closed packages.

In a more specific phase the invention relates to an apparatus for automatically handling filled receptacles, such as glass jars, and applying thereon suitable closures, such as hermetically sealed metal caps.

The general object of the invention is to provide an apparatus operating automatically to handle filled vessels, position them in proper relationship to a sealing mechanism, effect a sealing operation thereon, and remove them from association with the sealing mechanism, all with such speed and certainty of operation as to secure a continuous and rapid output without breakage or loss in the material handled.

A more particular purpose of the invention is the provision of an automatic machine whereby frangible vessels may be accurately positioned for the operation of the sealing mechanism, and removed therefrom, to form perfect packages independently of the element of human skill in the operator.

A further object of the invention is the provision of an apparatus for sealing vessels, which is continuous in operation as to supply of vessels thereto and removal of packages therefrom, and in which accuracy of the sealing operation is contributed to by virtue of the fact that the sealing mechanism does not partake of the progressive movement of the packages through the machine.

A further object of the invention is the provision of an apparatus of the sort described wherein the packages are stationary, so far as progressive movement is concerned, during the sealing operation, but in which the supply of vessels to the sealing operation and the removal of packages therefrom are continuous.

A further object of the invention is the provision of an apparatus of the sort specified which may be operated rapidly and continuously to handle unsealed vessels without spilling the contents thereof.

A further object of the invention is the provision of an apparatus of the sort specified possessing certain characteristics of construction whereby a given apparatus is enabled to accommodate and effect operations upon vessels of great variety of size and form.

A further object of the invention is the provision of an apparatus of the kind specified which is adapted to maintain its accuracy of operation, by virtue of a construction whereby the package positioning mechanism is subjected to a minimum of wear and strain in the operation of the machine.

A further object of the invention is the provision of an article-handling apparatus which is adapted to be applied to forms of sealing machines now in use.

Another object of the invention is the provision of a mechanism having the capabilities hereinabove mentioned and which is so simple in construction and positive in operation as to present minimum opportunity for disarrangement of function by fouling.

A further object of the invention is the provision of an apparatus possessing the attributes hereinabove specified which is of such simple construction and so few parts as to permit its being constructed and operated at a minimum cost and in small space.

Other and further objects of the invention will be pointed out hereinafter or will be obvious from the description, or indicated in the appended claims, reference being had to the accompanying drawings forming an illustrative disclosure of one form in which the invention may be embodied.

Described generally in one aspect, the invention comprises an apparatus which includes a sealing device which is adapted to form a closure on a packing vessel. This device is operated intermittently to permit the placing of successive vessels for the sealing operation and the withdrawal of the packages after it. Associated with the sealing device is what I will term a supply mechanism, and which is in the form of a continuously operating conveyor adapted to transmit vessels continuously to the sealing device, said conveyor being arranged so that it may be easily supplied with vessels by hand. Also associated with the sealing device is a removing apparatus similar in substantial details to the supply mechanism, and which includes an endless chain or conveyor adapted for continuous operation to remove packages from the sealing device and convey them to a desired point of disposal. Associated with the intermittently operating sealing device, the continuously operating supply mechanism, and the continuously operating removal mechanism, is an apparatus which I will term a positioning mechanism, and the function of which is to take individually the vessels which are supplied in a continuous succession by the supply mechanism, and place them singly and successively in proper position for the operation of the sealing mechanism upon them; and upon the completion of the sealing operation upon each package, this positioning mechanism is rendered effective upon it again to remove it from association with the sealing device and to place it under the control of the continuously operating removing mechanism. By virtue of the construction, while the supply of vessels successively to the positioning mechanism goes on continuously, and the removal of the packages successively from the positioning mechanism goes on continuously, by virtue of the effectiveness of the positioning mechanism upon the packages, each package is momentarily detained while the sealing operation is effected by the sealing devices which are maintained stationary with respect to the progressive movement of the packages through the machine.

Described generally, the positioning mechanism which I provide for effecting this operation comprises a continuously moving belt or conveyor associated at its extremities with the continuously operating supply mechanism at one end, and the continuously operating withdrawal mechanism at the other end. This continuously operating conveyor carries series of independently controlled and operated fingers which I term handling fingers and which are arranged to be operated through suitable control mechanism so that they are brought into contact with the successive vessels at the proper times to take them over from the supply mechanism without interruption of their progress; and said fingers are similarly controlled to effect their removal from each package immediately such package is in proper and accurate sealing position. Said fingers are further rendered effective, after the completion of the sealing operation upon each vessel, to assume control of the vessel and advance it from its position of rest and deliver it to the continuously operating removing mechanism. Various features of adjustment are provided whereby the apparatus may be accommodated to a great variety of vessels and packages, and all operating parts are so accurately and essentially articulated as to insure proper operation under all conditions of speed and supply.

In the said drawings Figure 1 represents a front elevation of the complete apparatus, the same being largely diagrammatic;

Figure 2 represents a sectional elevation of one form of machine, the said section being taken substantially on line A—A of Figure 3;

Figure 3 represents a side elevation of the machine, various parts being shown in section;

Figure 4 represents a top view of certain portions of the machine, showing the handling table and positioning mechanism, with certain parts broken away; and Figure 5 is a detail front elevation of the positioning chain.

It is to be understood that the embodiment of the invention herein shown and now about to be described represents but one of the various species of forms in which the invention may be embodied, and that therefore the present disclosure is for the purpose of illustrating the invention and not for the purpose of defining or limiting its scope to the particular form of machines disclosed.

Referring to these drawings by the reference numerals applied, it will be seen that the apparatus includes the elongated handling table 1—1' associated with a sealing device 2. The portion of the handling table indicated by the numeral 1 is the supply side, while the portion of the handling table indicated by the numeral 1' is the removal side. The handling table is sustained at its outer extremities by suitable supports 4 which preferably are adjustable to permit variation in the elevation of the supporting table. At their inner extremities the respective portions of the handling table are adjustably supported upon the pedestal 5, as will be explained presently.

The pedestal 5 is in the nature of a column maintained in upright position by a suitable base 6. The pedestal includes a bearing 7 for an operating shaft and suitable front bearings 8, and at its upper portion a proper bracket upon which the sealing device 2 is supported. Supported on the pedestal below the sealing device is a frame 9. This frame may be formed as an integral part of the pedestal, or when designed for application to sealing machines now in use, it may be provided with means whereby it may be affixed to the pedestal. In the present instance this means includes a center sleeve portion 10 adapted to fit between the frontal bearing members 8 and having a longitudinal bore adapted to register with the bearing openings, together with set screws 11 adjustably mounted in lateral arms of the frame and adapted to clamp a portion of the pedestal between them. By such means the frame may be adjusted to accurate position on the pedestal. The frame includes also laterally disposed guides 12 having vertical channels in which are slidably mounted supporting plungers 14. These plungers are arranged so that they may be adjusted longitudinally in the guides 12, as by the means illustrated, wherein the plungers are screw threaded and meshed with adjusting nuts 15 which bear against the upper extremities of the guides 12. Nuts 16 on the plungers 14 limit the upward movement of the latter by engagement against the lower extremities of the guides 12, and also function as lock nuts to lock the posts fixedly in proper adjustment. A quill 17 forms a centering connection for the sleeve 10 and the bearing members 8.

Mounted on the upper extremities of the plungers 14 is a housing 18 having sockets 19, in which the plungers 14 are seated, and a horizontal cover plate 20, which I shall call the transfer table. To one lateral extremity of the housing 18 is hinged the inner extremity of handling table 1, the hinge pintle being indicated at 21, and to the opposite lateral extremity of the housing is similarly hinged the inner extremity of handling table 1'. It will be obvious that by adjustment of the nuts 15 the elevation of the housing may be varied, and its spacial relationship to the sealing device 2 changed. Mounted adjacent the right-hand extremity of the housing 18 is a bearing frame 22 affording mounting for a vertical spindle 24 and a horizontally extending stub shaft 25. This bearing frame is slidably mounted on the housing 18 in a channel 26 so that it may be moved to a limited extent longitudinally of the housing, its position being determined by the adjustment of a nut 27 on a bolt 28 which is pinned to the frame 22 and slidable through the boss 29. Adjacent its other extremity, the housing 18 affords a bearing 30 for vertical shaft 31, and a bearing 32 for a horizontal stub shaft 34. As best seen in Figure 4, the stub shafts 25 and 34 carry at their extremities sprockets 36 and 37, and as shown in Figure 2 stub shaft 34 carries a helical gear 38. The sprockets 36 are conjoined by a sprocket chain 39 so that stub shaft 25 may be rotated by the rotation of shaft 34 imparted through helical gear 38. Each of the sprocket-wheels 37 is meshed with a sprocket-chain 40, each of which chains is supported on a sheave or sprocket 41 mounted on its associated standard 4.

Formed as a part of frame 9 is a laterally extending bracket 42 which affords a vertical bearing 44 for the shaft 31. A bracket 43, similarly supported, affords a bearing for a horizontal shaft 46. Shaft 46 is driven from power shaft 3 by means of sprockets 47 and 48 connected by a sprocket-chain, and shaft 46 is effective to drive shaft 31 by means of bevel pinions 49 and 50. As best seen in Figure 2, the connection between the pinion 49 and the shaft 31 is by means of a key 51 which rides in a long keyway in shaft 31 so that the shaft may be movable longitudinally through the pinion to accommodate the adjustments in elevation of housing 18 as above described.

By virtue of the operating connections thus far described, it will be obvious that power from power shaft 3 may be transmitted through sprockets 47 and 48 to shaft 46, and thence through shaft 31 to a helical gear 52 which drives into helical gear 38 to actuate shaft 34; thence, by rotation of shaft 34, and the connection afforded by sprockets 36 and 37 and chain 39, the conveying chains 40 may be transmitted continuously in the same direction and at the same constant speed. The proper tension may be maintained on chains 40 by suitable slack adjusters 54, and on the chain 39 by adjustment of the nut 27.

As best seen in Figure 3, the handling tables 1 and 1' may be formed of a pair of horizontally disposed plates 55 supported on angle bars 56 to give them the necessary rigidity, and which plates and angle bars are secured at their extremities in suitable connecting yokes 57. The plates 55 are spaced apart so as to afford a median slot extending longitudinally of the table. The chains 40 travel below the plates 55 and between the angle bars 56, being supported on track members 58 which are adjustably mounted in clamps 59 supported on the clamping screws 60, seated in the angle bars 56. By means of the adjustment of the screws 60 the track members 58 may be aligned relative to the slot, and the elevation of the chain relative to the surface of the plates 55 may be likewise varied by vertical adjustment of the track member 58 in the clamp 59. At suitable intervals, determined by the articulation of the parts, the chains 40 carry flights or lugs 61 suitably secured and of proper height to project through the slots and above the upper surface of the plates 55. On the upper surface of the plates 55 are secured lateral guides 62 in the form of long narrow strips or bars mounted on slotted clamping wings 64 adjustably secured to the plates 55 by means 65 so that the spacial relationship of the guides 62 relative to the slot may be varied as desired.

By virtue of this arrangement, vessels or containers such as cans, tumblers, bottles, jars, or the like, positioned upon the handling table 1, upon actuation of the mechanism as above described, will be transmitted along the surface of the table by virtue of the movement of the chain 40 and the engagement of the lugs 61 with them, and thus delivered at predetermined intervals onto the transfer table 20 formed by the cover plate of the housing 18. Likewise, at the other side of the sealing device 2, the articles will be transmitted from the transfer table 20 upon the surface of the handling table 1'. This arrangement therefore provides a means for accomplishing a continuous supply of containers to the operation of the sealing device, and a continuous withdrawal of packages therefrom.

I will next describe the means whereby the articles are handled and positioned for the accomplishment of the sealing operation, and by which they are transferred from the continuous supply mechanism to the continuous discharge mechanism.

As best illustrated in Figures 2 and 4, it will be observed that adjacent its upper extremity the shaft 31 carries a double sprocket 66 which is retained in place between clamping disks 67, by clamping nuts 68. Upon the upper end of the spindle 24 a similar double sprocket 69 is mounted in like fashion. Upon these sprockets is carried an endless double chain the details of the construction of which are best illustrated in Figure 5. As therein shown, this chain, which I will designate a transfer chain, is composed of two sprocket chains 73 connected by spacers 70. Upon certain of said spacers are rotatably mounted sleeeves 71, and upon said rotatable sleeves are adjustably secured handling fingers, preferably in pairs. These handling fingers are of two kinds, viz., positioning fingers, designated by the numerals 72, and removing fingers, designated by the numerals 74. These fingers are of bell-crank form and are secured to the sleeves 71 by means of split ring portions and clamping screws, so that the respective fingers in each pair may be disposed on different radii of the sleeves for the purpose hereinafter to be pointed out. Each of said fingers includes a vessel-engaging arm 75, and one finger of each pair includes a controlling arm 76. In the case of the positioning fingers the controlling arms are carried on the upper finger of the pairs, while in the case of the removing fingers, the controlling arms are on the lower fingers of the pairs. In the controlling arms are mounted antifriction rollers 77 on pivots parallel to the pivots of the fingers, and each pair of fingers is held under tension of a contractile spring 78, the tendency of which is to swing the fingers backwardly into what I will designate as their retracted position. The backward movement of the fingers is stopped by adjacent spacers which also provide points of anchorage for the springs 78. As best illustrated in Figure 4 it will be seen that the size and arrangement of the sprockets 66 and 69 are such that the posterior stage of the double chain is transmitted adjacent the path defined by the guides 62, and that the fingers in their retracted positions travel outside of said path; but when in their projected position, their vessel-engaging arms travel above said path and above the spockets 37 which establish the terminals of the continuously operating supply and removal mechanisms. The movement of the positioning fingers to projected positions is determined by cams. The cam designated by the numeral 79 determines the operation of the positioning fingers.

It will be observed in Figure 4 that its right-hand extremity is bent around the sleeve of the double sprocket 69 and lies in the path of the rollers 77 on the controlling arms of the positioning fingers. As a consequence, when the controlling arm of each pair of positioning fingers is moved against the end of this cam, they will be swung to projected position and maintained in that position until the roller 77 moves off of the left-hand extremity of said cam. The position of the left-hand extremity of said cam is determined by an adjustable plate 80 forming a portion of the cam adapted for engagement with the rollers. A cam 81 is similarly arranged to control the position of the removing fingers, being placed at a lower level than the cam 79 and in the path of the rollers 77 mounted on the controlling arms of said fingers. The position of the right extremity of cam 81 may be changed by means of the adjustable plate 83. These cams are mounted on bolts 82 seated in the cover plate of the housing 18, from which the cams are spaced by means of sleeves 84. The right-hand extremity of the cam 81 is positioned slightly to the left of the left-hand extremity of the cam 79, and the left-hand extremity of the cam 81 is positioned somewhat to the left of the sprocket 37 of the removing mechanism. Mounted on the cams 79 and 81 are brackets 85, on the posterior extremities of which is mounted the channel guide 86 which cooperates with a similar lower channel guide 87 to sustain the posterior stage of the chain in effective position.

Beneath the position occupied by the sealing device 2, the transfer table is apertured to accommodate the lifting platform 88 which is disposed in the path defined by the guides 62. The platform 88 is carried at the upper extremity of a lifting rod 89, being yieldably supported by means of a spring 90, as illustrated in Figure 2. The lifting rod 89 is slidably mounted in the bearing members 8 and operates through the quill 17. Below the bearing members it is adjustably secured in a block 91 by means of a set screw 92. The block 91 carries the rearwardly projecting roller 94 which rides in the slot 95 of the face cam 96 which is fixed for rotation with the shaft 3. Also mounted on shaft 3 is an eccentric 97 which cooperates with the yoke 98 to reciprocate the rod 99, whereby operation of the sealing device 2 is effected intermittently. As a result of this arrangement of parts, when shaft 3 is operated, the lifting rod 89 is reciprocated vertically so that lifting platform 88 is in its elevated position at the time of the operation of the sealing device 2. In its lower position lifting platform 88 is flush with the upper surface of the transfer table 20.

Through the operating connections the transfer chain is articulated with the chains 40 so that a pair of the positioning fingers 72 crosses the center line of the sprocket 37 at the terminus of the supply mechanism simultaneously with one of the lugs 61, and one of the removing fingers 74 crosses the center line of the sprocket 37 at the inner end of the removing mechanism slightly in advance of each of the lugs on the removing chain. As a result of this arrangement of parts the transferring and sealing operations are effected as follows:

The vessels being continuously transmitted at regular and definite periods to the terminus of the supply mechanism at the sprocket 37, each vessel is there engaged by a pair of positioning fingers 72 which are traveling at the same speed as is the transmitting chain, said positioning fingers being maintained in their projected position by cam 79, and the vessel, due to the movement of the transfer chain, is carried onto the lifting platform 88. When the vessel has been thus positioned on the platform, the positioning fingers, which have carried it thus far, are instantly retracted out of engagement with the vessel immediately the roller 77 moves off the end of the controlling cam member 80. This leaves the vessel in position on the platform 88 beneath the sealing device 2. At this point in the cycle of the machine the cam 96 becomes effective to lift the rod 89, moving the platform 88 and the vessel thereon upwardly and into engagement with the seal forming members of the sealing device 2. The latter then being operated through the instrumentality of the eccentric 97 to form the seal or closure upon the vessel, the lifting platform 88 is quickly lowered to the charging position. The advance of the transfer chain having continued during these operations, by the time the platform has reached its lower level, the adjacent pair of receiving fingers will be quickly swung to projected position by the engagement of their roller against the right-hand end of the cam 81, and said fingers will engage the sealed package on the lifting platform and carry it leftward past the sprocket 37 of the removing mechanism. When the roller reaches the end of the cam 81 the removing fingers will be retracted by their spring and the package from that point will be carried forward by one of the lugs of the removing chain 40. During the time a vessel remains upon the lifting platform 88 the succeeding vessel gains distance upon it, but, as each vessel is similarly detained during the sealing operation, they are delivered at proper intervals to the receiving mechanism so as to be picked up by the lugs of the removing chain. It is obvious therefore, that the operations of supply and removal are continuous although the package is not advanced during the sealing operation. Furthermore, inasmuch as the package is transmitted at uniform speed, and is stopped but once, it is free from any tendency to splash out the liquid contained in the vessel; and by virtue of the fact that the position of the vessel upon the lifting platform is determined automatically and mechanically, proper positioning of the closure for the operation of the sealing device is insured.

This accuracy of the positioning operation is maintained in the apparatus by virtue of the fact that the positioning mechanism is not subjected to strains or wear incident to intermittent movement, and due to the fact that the chain is short and is not required to handle a large number of vessels at a time. This avoids subjecting the chain to wear such as might render it inaccurate for customary usage.

The apparatus as above described is adapted for a wide range of adjustments to accommodate a great variety of vessels. During the course of progressive movement of the vessel through the machine, it is guided by the guide rails 62 which, by virtue of their adjustable mountings 64 and 65, may be so positioned as to accommodate and properly cooperate with vessels having a great range in width or diameter. Due to the fact that the points of retraction of the positioning fingers 72, and of projection of the removing fingers 74, may be determined by the adjusting cam members 80 and 83, and because of the adjustability of the transfer chain by rotation of sprockets 66 and 69 on their shafts, vessels of any diameter within the intended range may be accurately centered on the lifting platform, and accurately removed therefrom. Likewise, by virtue of the independent adjustability of the respective fingers of each pair, they may be disposed on different radii so as to compensate for taper or other irregularity in the contour of vessels, and thereby derive accurate and effective opeating bearing against the vessel wall. The adjustability of the handling table and the transfer table as to elevation, and the corresponding adjustability of the rod 89 in its block 91 afford the necessary adjustments to accommodate the machine to vessels of different heights. As the result of these several features, the machine is practically universal in its utility, and insures the safety of the package against breakage or spilling, and also obtains a large output at small expenditure of power and labor.

The sealing device, to which I have referred generally, may be of any effective type for applying closures to the vessels, many kinds of such devices being well known in the art. In the embodiment illustrated, the sealing device is represented as being of the type disclosed in the patent to Hull, No. 1,134,065. The apparatus as a whole, while designed for continuous operation, may be controlled for intermittent operation. In the arrangement of the mechanism shown, power is supplied from the driving element 100 and through suitable gearing and the jack shaft 101 to the gear 102, which is rotatably mounted on the shaft 3. By means of suitable clutch mechanism, one element of which is illustrated at 104, and which mechanism may be of the general type disclosed in the patent to Hull above mentioned, the gear 102 may be clutched to rotate shaft 3 to accomplish the operation of the mechanisms hereinbefore described. The clutch element 104 is controlled by a spring-returned foot lever 105, by successive operations of which the machine may be controlled to operate intermittently. The foot lever 105 may be held indefinitely in its lower position, or may be locked there by means of a latch 106, and while so held or locked the operation of the apparatus will be continuous. A hand wheel 107 is arranged so that the entire apparatus may be operated manually for the purpose of verifying articulation and testing adjustments.

There may be applied to the device, as a safety factor, a cover guide 108 in the nature of a plate extending in advance of the sealing device 2 in position to receive the vessels beneath it as they are fed to the lifting platform 88. The forward end of the plate being upturned and the plate being somewhat resiliently supported on brackets 109, it will operate effectively to press the covers of the vessel into place preparatory to the sealing operation, and prevent their striking against the side of the sealing device as might happen if they were not completely seated. This guide extending to the point where the positioning apparatus takes over control of the vessel from the supply apparatus, also tends to hold the vessel steady against any jarring incident to its delivery from one mechanism to the other, and thereby contributes to preventing the slopping out of liquid contents of the vessels. The brackets 109 are adjustably secured to the housing 18 so that the plate 108 may be properly positioned relatively to the track plates 55 to accommodate various sizes of vessels. A guard 110 of wire mesh or the like may be conveniently mounted on the housing 18 in position to protect the positioning mechanism from interference.

The apparatus as thus organized is entirely automatic in that it does not require the attention of an operator. The filled vessels may be delivered directly to the supply mechanism from a filling machine, and the covers positioned on the vessels either by hand or by machinery for that purpose, and the vessels after sealing may be delivered by the removing mechanism to a washing, labelling, or packing apparatus. Not only does this feature of the machine save the cost of an operator, but it also effects a great saving in the cost of operation, due to the increased speed and absence of breakage, which last mentioned loss is due for the most part to lack of care and accuracy on the part of the operator in positioning the vessel for the sealing operation and the removal of the packages therefrom.

The apparatus is adapted to be operated at a great variety of speeds and with small expenditure of power, and occupies but little space. Moreover, as mentioned above, it is designed to be applied to sealing machines of various types now in use.

Having thus described my invention, what I claim is:

1. In a packaging apparatus, the combination with a sealing device of a table associated therewith for handling receptacles presented to the sealing device, said table being adjustable relative to the said sealing device for the accommodation of various receptacles, a handling table associated with said first mentioned table, and mechanism associated with said handling table for transmitting articles thereon and onto said first mentioned table, one extremity of said handling table having a hinged connection with said first mentioned table and the other extremity of said handling table being movable relative to the first mentioned table.

2. In a packaging apparatus, the combination with an intermittently operating mechanism of a continuously operating supply mechanism effective to advance vessels continuously in succession at a constant speed along a substantially straight path, and a positioning mechanism effective to engage vessels during their movement by the supply mechanism and advance them at the same speed into position for the action of the operating mechanism.

3. In a packaging apparatus, the combination with an intermittently operating sealing mechanism of a supply mechanism to advance containers in a continuous succession at a constant speed, a positioning mechanism effective to advance containers from the supply mechanism to the sealing mechanism at a speed constant with that of the former, and a guide for maintaining the containers in a straight line during their movement by the supply and positioning mechanisms.

4. In a packaging apparatus, the combination of a continuously operating supply mechanism effective to advance a vessel at a constant speed, a conveying device associated therewith and operable to move a vessel therefrom at the same speed, independently operable engaging members carried by the conveying device in position for cooperation with a vessel in movement on the supply mechanism, and means for rendering a plurality of said engaging members effective upon a vessel successively.

5. In a sealing machine, a vessel positioning mechanism including a transmission chain, means for transmitting the same at constant speed, extensible positioning members carried by the chain, extensible removing members carried by the chain and associated with the positioning members, and controlling devices for determining the extension of said members and rendered effective thereon by movement of the chain.

6. In a sealing machine, a positioning mechanism including a transmission device, means for transmitting said device continuously, a series of positioning members carried by the transmitting device, a series of removing members carried by the transmitting device, said positioning and removing members being disposed alternately on the transmitting device, said members being extensible for engagement with containers to effect advance thereof, and means rendered effective by the movement of the transmitting device to accomplish extension of said members severally.

7. In a sealing machine, the combination with a support arranged to accommodate the movement of vessels, of a transmitting device, means for operating the transmitting device to move vessels on the support, and engaging members carried by the transmitting device for engagement with a vessel on the support, said engaging members being individually adjustable to vary their angular relationship to the transmitting device to compensate for variations in the form of vessels.

8. In a sealing apparatus, the combination with a support for vessels, of a closure affixing device operating above said support, supply mechanism operating along said support to move vessels thereon toward the closure affixing device, a positioning mechanism operable to take vessels from the supply mechanism and position them for the closure affixing operation, and a retaining member associated with said support and effective to engage the covers of vessels to retain them in position during their transfer from the supply mechanism to the positioning mechanism and their movement by the latter to the closure affixing device.

9. In a packaging machine, the combination of a sealing device, a support for vessels associated with the sealing device, a positioning mechanism associated with the sealing device, articulated operating connections for actuating said sealing device intermittently and for driving said positioning mechanism continuously, individually movable handling members operable by the positioning mechanism to position vessels on said support individually, and adjustable controlling devices for determining the time relationship of operations of said engaging members and the sealing device.

10. In a packaging machine, the combination of a sealing device, a support for vessels, a guide on said support for determining one position of vessels thereon relative to the sealing device, a positioning mechanism operable with a continuous unidirectional movement to move vessels along said guide, means for effecting intermittent operation of the sealing device upon vessels presented thereto by the positioning mechanism, and adjustable means effective upon the positioning mechanism to predetermine the extent of movement of vessels presented successively to the sealing device.

11. In a sealing machine, the combination of an intermittently operated sealing head fixed against lateral movement, a conveyor arranged for continuous unidirectional operative movement adjacent the sealing head, and adjustable means for selectively predetermining the operations of said conveyor to position a vessel at the sealing head before an operation thereof and to remove the vessel from the sealing head after its operation thereon.

12. In a sealing mechanism, the combination of an intermittently operated sealing device fixed against lateral movement, a positioning mechanism associated therewith and including vessel engaging members, means for actuating said positioning mechanism to give said vessel engaging members continuous orbital movement, and adjustable means for selectively predetermining operations of the vessel engaging members to present vessels successively to the sealing device and remove them therefrom.

13. In a sealing machine, the combination of a positioning mechanism having vessel engaging members, means for actuating said mechanism to give said members continuous orbital movement, a work support which is stationary with respect to the direction of movement of said members, and adjustable means for selectively predetermining operations of said members to accomplish movement of vessels onto and off of said work support by the positioning mechanism.

14. In a sealing machine, the combination of a work support, vessel engaging members arranged for orbital movement across said work support, means for revolving said members continuously in their orbit, and means for controlling movement of said vessel engaging members individually to render successive ones thereof effective and ineffective upon vessels in their orbit.

15. In a sealing machine, the combination of a work support, positioning mechanism associated therewith and including work engaging members effective over the work support, means for actuating said positioning mechanism to give said members continuous orbital movement, and controlling means for retracting certain of said work engaging members to render them ineffective upon a vessel on the work support, said controlling means being selectively adjustable to predetermine the point at which the work engaging members are rendered ineffective.

16. In a sealing machine, the combination of a work support, positioning mechanism associated therewith and including vessel engaging members movable to position vessels on the support, means for actuating said positioning mechanism to give said vessel engaging members continuous orbital movement, means for lifting the work support periodically, and controlling means for retracting certain of the vessel engaging members from over the work support; said controlling means being adjustable to predetermine the point in their travel whereat the vessel engaging members are retracted.

17. In a sealing machine, the combination of a periodically operating sealing device, a supply mechanism operating to predetermine the relative position of vessels and advance them in succession toward the sealing device at a constant speed, a support for receiving sealed vessels from the sealing device, and a positioning mechanism operating to move vessels from the supply mechanism at a speed uniform with that of the supply mechanism; said positioning mechanism including portions effective to dispose successive vessels stationarily at the sealing device in sealing position.

18. In a package handling machine, the combination of a conveying mechanism adapted to transmit vessels continuously in a series, said conveying mechanism including members adapted to engage the respective vessels to determine their relative spacing, a positioning mechanism effective upon vessels in transit by the conveyor mechanism to move them therefrom, said positioning mechanism including engaging members operable to engage respective vessels in succession, means for driving the conveyor mechanism and positioning mechanism and means for independently adjusting the positioning mechanism relative to the conveyor mechanism to change the relationship of the engaging members of the former relative to those of the latter.

19. A package handling machine, the combination of a supply mechanism adapted to transmit vessels continuously in series, a positioning mechanism effective to move vessels therefrom, said supply mechanism and positioning mechanism having engaging members effective contemporaneously at different heights upon a vessel, and means for effecting relative adjustment of the supply mechanism and positioning mechanism to vary the relative positions of engaging members thereof effective cotemporaneously on a given vessel.

20. In a packaging apparatus, the combination of a sealing device, and positioning means adapted to position packages to be sealed at a sealing station, said positioning means comprising a continuously movable conveyor, two series of fingers mounted upon said conveyor, one of said series being feeding fingers, and the other of said series being take-off fingers, cam members for controlling the operation of the said fingers, means for adjusting the cam member for the feeding fingers, and means for adjusting the cam member for the take-off fingers to control the operation of these fingers.

21. In a packaging apparatus, the combination of a sealing device, and positioning means adapted to position packages to be sealed at a sealing station, said positioning means comprising a continuously movable conveyor, two series of fingers mounted upon said conveyor, one of said series being feeding fingers, a cam member for controlling the operation of the feeding fingers, and means for adjusting the cam member for the feeding fingers to control the operation of the same.

22. In a packaging apparatus, the combination of a sealing device, and positioning means adapted to position packages to be sealed at a sealing station, said positioning means comprising a continuously movable conveyor, two series of fingers mounted upon said conveyor, one of said series being take-off fingers, a cam member for controlling the operation of the take-off fingers, and means for adjusting the cam member for the take-off fingers to control the operation of these fingers.

23. In a packaging apparatus, the combination with a sealing device, of means to guide packages in substantially a straight line path to said sealing device, supply mechanism operating to predetermine the spacing of packages and move same with a continuous movement along said path, and positioning mechanism in operative engagement with each package before the package leaves the supply mechanism and being adapted to move the said packages to the sealing device at the same rate at which they are traveling.

24. In a packaging apparatus, the combination with a sealing device, of means to guide packages in substantially a straight line path to said sealing device, supply mechanism operating to predetermine the spacing of packages and move same with a continuous movement along said path, and positioning mechanism comprising movable fingers in operative engagement with each package before the package leaves the supply mechanism and being adapted to move the said packages to the sealing device at the same rate at which they are traveling.

25. In a packaging apparatus, the combination with a sealing device, of means to guide packages in substantially a straight line path to said sealing device, supply mechanism operating to predetermine the spacing of packages and move same with a continuous movement along said path, and positioning mechanism comprising movable fingers moving in a straight line and in operative engagement with each package before the package leaves the supply mechanism and being adapted to move the said packages at the same rate at which they are traveling.

26. In a packaging apparatus, a sealing device, means to guide packages toward the sealing device in substantially a straight line path, package supply mechanism comprising a continuously movable member adapted to move packages along a portion of said path, and package positioning mechanism comprising a conveyor adapted to remove the packages from said supply mechanism without change of speed or direction, movable fingers upon said conveyor, said fingers being operative on packages moved by said supply mechanism when said fingers are moving throughout their length at a speed substantially equal to the speed of the supply mechanism whereby the speed of packages when moved under the control of said fingers is the same as the speed when the packages are moving under the control of said supply mechanism, and means to cause said fingers to be inoperative to move said packages beyond the sealing station.

27. In combination in a packaging apparatus, a sealing device, positioning mechanism adapted to move packages to be sealed to a station adjacent said sealing device, said positioning mechanism comprising a conveying member, two series of fingers mounted upon said conveying member, one of said series being adapted to position packages at the sealing station and the other of said series being adapted to remove packages from said sealing station, and means whereby the operation of the fingers in the positioning series may be adjusted so that the zone of effective operation of said fingers may be increased or diminished.

28. In combination in a packaging apparatus, a sealing device, positioning mechanism adapted to move packages to be sealed to a station adjacent said sealing device, said positioning mechanism comprising a conveying member, two series of fingers mounted upon said conveying member, one of said series being adapted to position packages at the sealing station and the other of said series being adapted to remove packages from said sealing station, means whereby the operation of the fingers in the positioning series may be adjusted so that the zone of effective operation of said fingers may be increased or diminished, and a movable table between the zones of operation of said fingers and being adapted to raise the packages successively into engagement with the sealing device.

MAX JAEGER.